US009288670B2

(12) United States Patent
Engelhart

(10) Patent No.: US 9,288,670 B2
(45) Date of Patent: Mar. 15, 2016

(54) DYNAMIC DISTRIBUTION OF AUTHENTICATION SESSIONS

(71) Applicant: T-Mobile USA, Inc., Bellevue, WA (US)

(72) Inventor: Robert Engelhart, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 308 days.

(21) Appl. No.: 13/866,390

(22) Filed: Apr. 19, 2013

(65) Prior Publication Data

US 2014/0315518 A1 Oct. 23, 2014

(51) Int. Cl.
*H04W 12/06* (2009.01)
*H04L 29/06* (2006.01)
*H04L 29/08* (2006.01)

(52) U.S. Cl.
CPC .......... *H04W 12/06* (2013.01); *H04L 63/0846* (2013.01); *H04L 63/108* (2013.01); *H04L 67/1004* (2013.01)

(58) Field of Classification Search
CPC ............ H04L 67/1004; H04L 63/0846; H04L 63/108; H04W 12/06
USPC .................................................. 455/410, 411
See application file for complete search history.

(56) References Cited

U.S. PATENT DOCUMENTS

2011/0264781 A1* 10/2011 Moser et al. .................. 709/223
2013/0252583 A1* 9/2013 Brown et al. .................. 455/411
2014/0075238 A1* 3/2014 Dupont et al. ................ 713/502

* cited by examiner

*Primary Examiner* — Nathan Mitchell
(74) *Attorney, Agent, or Firm* — Knobbe, Martens, Olson & Bear, LLP

(57) ABSTRACT

This disclosure relates to authenticating and providing transport security over unsecured IP networks to network subscribers. The system includes an authentication service that authenticates network subscribers. The authentication service can dynamically define expiry times for network authentication.

17 Claims, 6 Drawing Sheets

DYNAMIC DISTRIBUTION OF AUTHENTICATION SESSIONS

BACKGROUND

Subscribers of telecommunication devices, such as mobile phones, are able to use a vast amount of different services, most of them requiring some kind of authentication. The user had to manage with different credentials manually, which can become a considerable nuisance, when the amount of used services grows. Also, this annoyance with the credentials can also create security problems, for example, as the users use the same, weak passwords over and over again for different services. Also, if the service providers should provide all the necessary credentials to the users, it could be very expensive.

A service provider can provide an automated authentication over the network. The automated authentication can be handled by the service provider using credentials within the telecommunication device. The service provider can provide an authentication service for clients and servers that require shared secret based authentication. The telecommunication devices can authenticate themselves to the operator's authentication service using authentication protocols. This can facilitate the authentication process between telecommunication devices and various services, and reduce the aggravation for subscribers.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
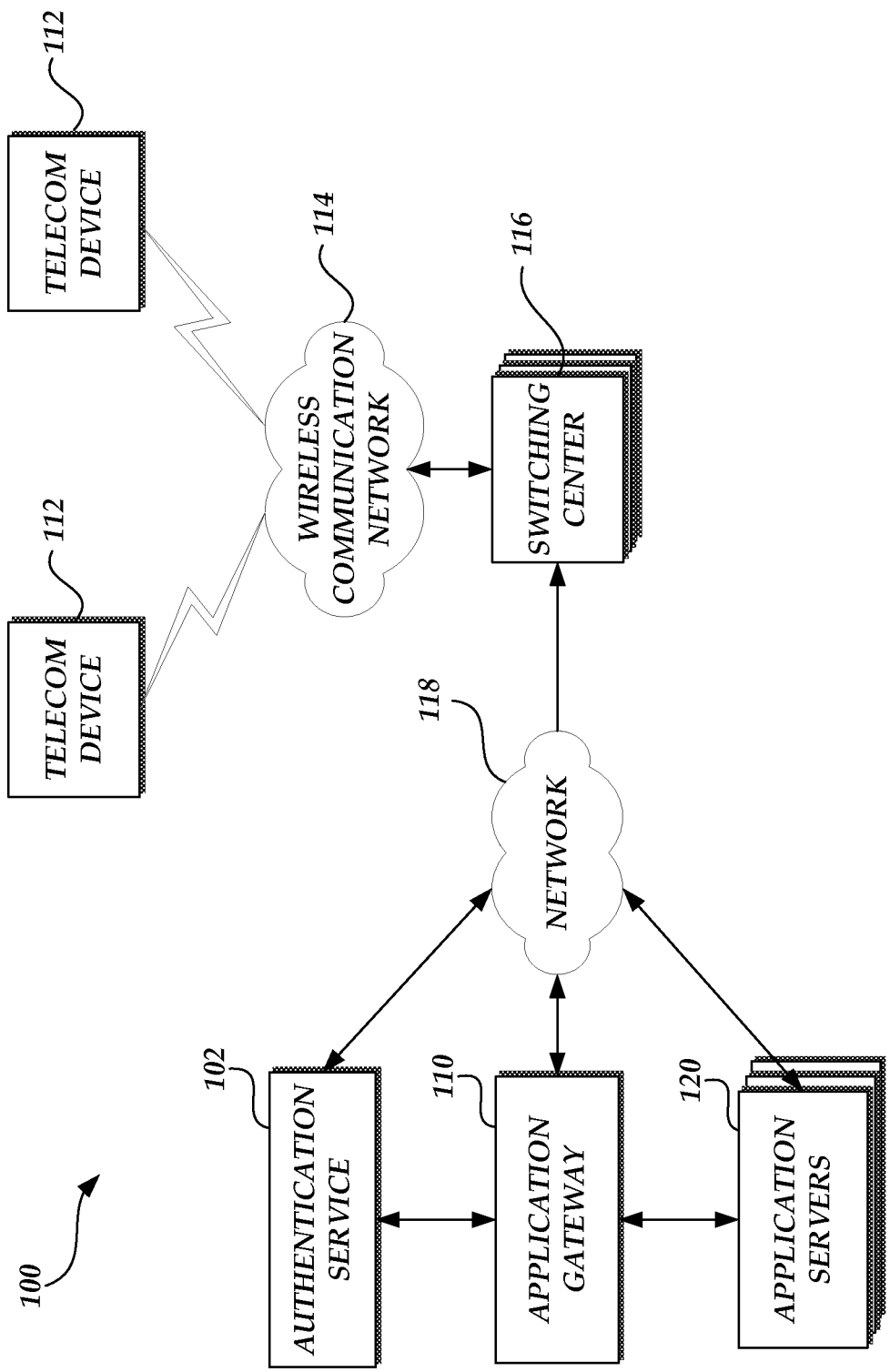
FIG. 1 is a block diagram depicting an illustrative telecommunications device communication environment.

Generally described, the present disclosure relates to authentication of telecommunication devices securely over an unsecured network (e.g., the Internet). Proper authentication can allow telecommunication devices on an unsecured network to communicate securely through a cellular network. A telecommunication-based system can include an authentication service that authenticates and provides transport security to network subscribers over an unsecured network (e.g., the Internet). The authentication service allows for the user to authenticate automatically without having to manually authenticate with a username and password each time a web application is accessed. For example, the authentication service can be used to authenticate with web-based applications using a browser or dedicated application on a telecommunication device through the cellular network.

Illustratively, the authentication service allows identity management based on subscriber credentials (e.g., subscriber information identification module (SIM) on a universal integrated circuit card (UICC)) provided by the telecommunication device over the cellular network. Illustratively, the telecommunication device sends a request to the authentication service that it would like to authenticate. The authentication service processes the request and initiates a protocol exchange with the telecommunication device for authentication. After a successful authentication session, the authentication service generates and sends an authentication token to the telecommunication device. The authentication token can be used by the telecommunication device and an application gateway to establish secure communication between the telecommunication device and application servers for a web application. The authentication token expires after a finite amount of time. The expiration of the authentication token is defined by an expiry time that is determined when the authentication token is created. After the authentication token expires, the telecommunication device can initiate the authentication process again and the authentication service can generate another authentication token.

Illustratively, subscribers tend to initiate authenticate sessions during certain time periods. As such, authentication sessions can cluster at certain time periods rather than being distributed evenly across a number of time periods throughout the day. This clustering can cause high load to be placed on the authentication servers for short periods of time, and minimal load at other times. The authentication sessions can be more evenly distributed by using a configurable expiry time to help distribute authentication sessions throughout the day. Illustratively, the authentication service can determine a configurable expiry time for authentication tokens. The configurable expiry time can change to account for variables, such as the expected server load. For example, the authentication service can evaluate the expected number of subscribers that are scheduled to authenticate at time periods throughout the day. The authentication service can determine the appropriate distribution of authentication sessions for each time period. Based on the determination, the authentication service can set expiry times for the authentication tokens that properly distribute the authentication sessions to different time periods throughout the day. The dynamic determination of expiry times can help balance the load on the authentication servers.

Although aspects of the present disclosure will be described with regard to an illustrative telecommunication environment and component interactions, communication protocols, flow diagrams and user interfaces, one skilled in the relevant art will appreciate that the disclosed embodiments are illustrative in nature and should not be construed as limiting. Specifically, although the term telecommunication device is used in this document, the term represents any type of device having a component for communicating with one or more other devices via one or more communication paths. Such communication paths can include wireless communication paths (via infra-red, RF, optical, terrestrial, or satellite communication media) and wired communication paths. Additionally, although the present disclosure references a telecommunication device, one skilled in the relevant art will appreciate that a telecommunication device may also be referred to as a wireless computing device, a mobile communication device, or a computing device. Examples of telecommunication networks and devices are described below. Accordingly, reference to a telecommunication device should not be interpreted as including any particular functionality or operation not described in the present disclosure. Still further, although the present disclosure is described with regard to specific methodologies and frameworks for distributing authentication sessions, the present disclosure should not be construed to require combination of the disclosed embodiments or any specific variation unless such combination or variation is expressly identified.

With reference now to FIG. 1, a block diagram illustrative of a telecommunication environment 100 will be described. The telecommunication environment 100 can include an authentication service 102. In an illustrative embodiment, the authentication service 102 may be utilized to provide authentication and transport security services over unsecured networks (e.g., the Internet) to network subscribers. The authentication service can establish a security association with the telecommunication device 112 by running an authentication session (e.g., a bootstrapping procedure). The security association establishes a set of parameters during the authentication session. The authentication parameters can include a username (e.g., a bootstrapping transaction identifier (B-TID)), password (e.g., key material), an expiry time, and application specific security parameters related to the subscriber. In some embodiments the authentication service 102 can establish the security association with the telecommunication device 112 over a Ub (UE-BSF) interface. In some embodiments, a valid cellular subscription is required for authentication between the telecommunication device 112 and authentication service 102.

The telecommunication environment 100 can include an application gateway 110. In an illustrative embodiment, the application gateway 110 may be utilized to authenticate and authorize subscriber telecommunication devices 112 to use existing network services using public wireless networks. The authentication service 102 can be used to establish a secure connection path between the telecommunication device 112 and the application gateway 110. In some embodiments the telecommunication device 112 and application gateway 110 can communicate over a Ua (UE-NAF) interface and the application gateway 110 and authentication service 102 can communicate over a Zn interface.

In one embodiment, the authentication service can be a bootstrapping server function (BSF) and the application gateway can be a network application function (NAF). The BSF and the NAF can be implemented in accordance with 3GPP TS 33.220, 3GPP TS 33.222, 3GPP TS 33.223, 3GPP TS 23.401, 3GPP TS 24.109, and 3GPP TS 29.109, and all documents referenced therein. One skilled in the art may identify other mechanisms.

While the authentication service 102 and application gateway 110 are each depicted in FIG. 1 as implemented by a single computing device in the telecommunication device communication environment 100, this is illustrative only. The authentication service 102 and application gateway 110 may each be embodied in a plurality of computing devices, each executing an instance of the group information processing service. A server or other computing device may include memory, processing unit(s), and computer readable medium drive(s), all of which may communicate with one another by way of a communication bus. The network interface may provide connectivity over the network 118 and/or other networks or computer systems. The processing unit(s) may communicate to and from memory containing program instructions that the processing unit(s) executes in order to operate the authentication service 102 and application gateway 110. The memory generally includes RAM, ROM, and/or other persistent and auxiliary memory.

The telecommunication environment 100 can include a plurality of application servers 120. In an illustrative embodiment, the application servers 120 can refer to services offered by a network service provider or a third party to the mobile subscriber. The application services can include internet-based services such as, visual voice mail, multimedia messaging service (MMS), network address book, Web2Go, and any other internet-based applications. Each application server may be embodied by a plurality of computing devices or servers.

With continued reference to FIG. 1, the telecommunication environment 100 can include a number of telecommunication devices 112, each associated with a user. The telecommunication devices 112 can correspond to a wide variety of devices or components that are capable of initiating, receiving or facilitating communications over a communication network including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, and the like. In an illustrative embodiment, the telecommunication devices 112 include a wide variety of software and hardware components for establishing communications over one or more communication networks, including wireless communication network 114, a wired communication network (not shown), or an IP-based telecommunication network (not shown). Illustrative components of a telecommunication device 112 will be described in greater detail with regard to FIG. 2.

In an illustrative embodiment, the telecommunication device communication environment 100 can include a number of additional components, systems and/or subsystems for facilitating communications with the telecommunication devices 112, and/or the authentication service 102. The additional components can include one or more switching centers 116 for establishing communications with the telecommunication devices 112 via the wireless communication network 114, such as a cellular radio access network, a wireless network based on the family of IEEE 802.11 technical standards ("WiFi"), a wireless network based on IEEE 802.16 standards ("WiMax"), a converged wireless telecommunication network such as Unlicensed Mobile Access ("UMA"), or General Access Network ("GAN"), and other wireless networks. The operation of mobile communication networks, such as wireless communication network 114 are well known and will not be described in greater detail. As illustrated in FIG. 1, the switching center 116 includes interfaces for establishing various communications via a communication network 118, such as the Internet, intranets, private networks and point to point networks, generally referred to as the "network." Although the wireless communication network 114 is illustrated as a single communication network, one skilled in the relevant art will appreciate that the communication network can be made up of any number of public or private communication networks and/or network connections.

Figure 2:
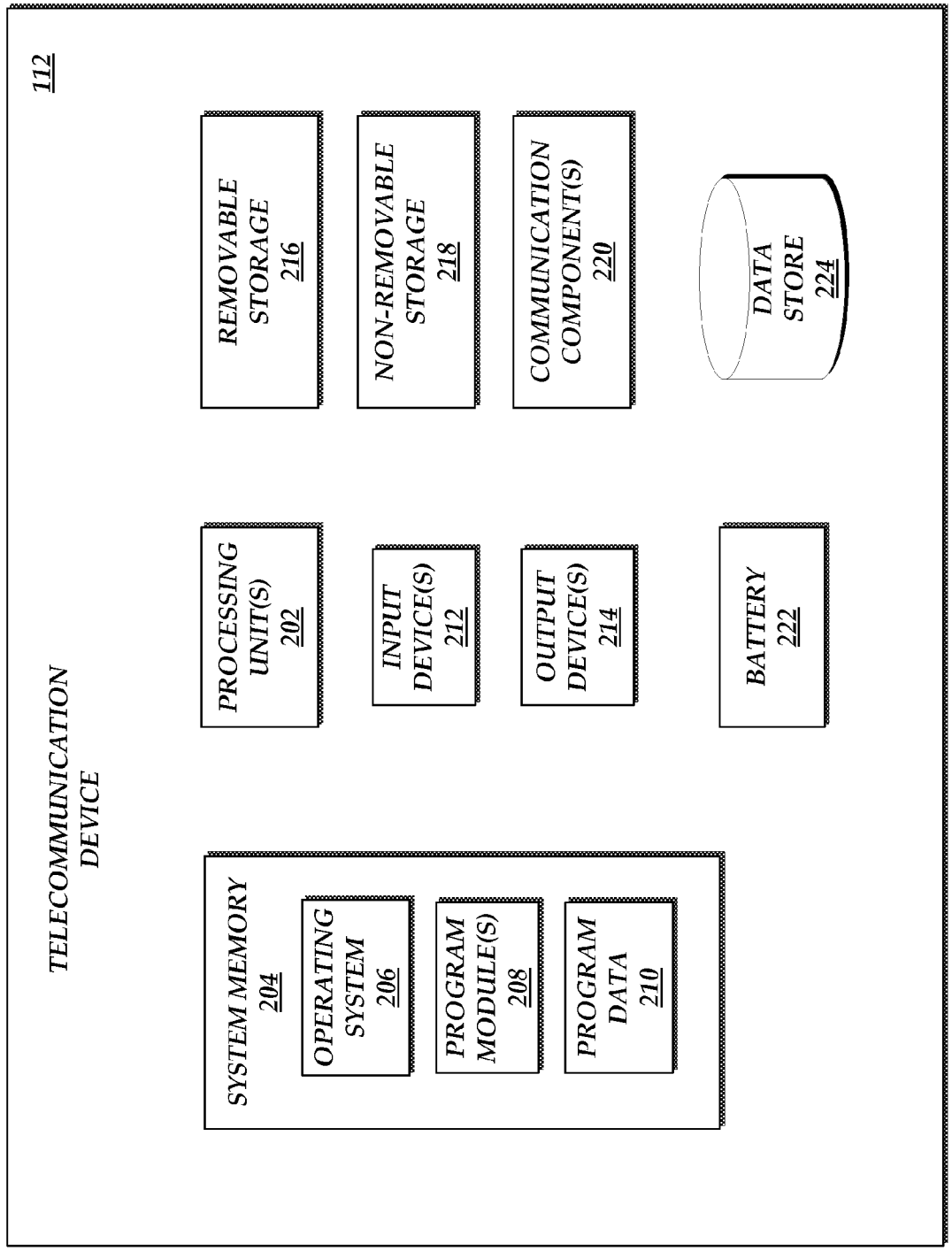
FIG. 2 is a block diagram depicting illustrative components of a telecommunications device.

FIG. 2 illustrates components of a telecommunication device 112, such as a mobile telephone. The telecommunication device 112 may include one or more processing units 202, such as one or more CPUs. The telecommunications device 112 may also include system memory 204, which may correspond to any combination of volatile and/or non-volatile computer-readable storage media. The system memory 204 may store information which provides an operating system module 206, various program modules 208, program data 210, and other modules. The above-enumerated list of components is representative and is not exhaustive of the types of functions performed, or components implemented, by the telecommunication device 112. One skilled in the relevant art will appreciate that additional or alternative components may also be included in the telecommunication device 112 to carry out other intended functions such as mobile telephone functions.

The telecommunications device 112 performs functions by using the processing unit(s) 202 to execute modules stored in the system memory 204. The telecommunications device 112 may also include one or more input devices 212 (keyboard, mouse device, specialized selection keys, etc.) and one or more output devices 214 (displays, printers, audio output mechanisms, etc.). One skilled in the relevant art will appreciate that additional or alternative software modules and/or hardware components may also be included in the telecommunications device 112 to carry out other intended functions such as mobile telephone functions.

With continued reference to FIG. 2, the telecommunications device 112 may also include a battery 222, one or more types of removable storage 216, and one or more types of non-removable storage 218. In some embodiments the device can be connected to an external power source, such as an AC power outlet. Still further, the telecommunications device 112 can include communication components 220, such as a cellular transceiver and a wireless transceiver, for facilitating communication via wired and wireless communication networks. These transceivers facilitate such communication using various communication protocols including, but not limited to, Bluetooth, the family of IEEE 802.11 technical standards ("WiFi"), the IEEE 802.16 standards ("WiMax"), short message service ("SMS"), voice over IP ("VoIP") as well as various generation cellular air interface protocols (including, but not limited to, air interface protocols based on code division multiplex access (CDMA), time division multiple access (TDMA), global system for mobile communications (GSM), wireband code division multiplex access (WCDMA), code division multiplex access $3^{rd}$ generation (CDMA2000), time division synchronous code division multiple access (TD-SCDMA), wavelength and time division multiple access (WTDMA), long term evolution (LTE), orthogonal frequency division multiple access (OFDMA), and similar technologies).

Figure 3A:
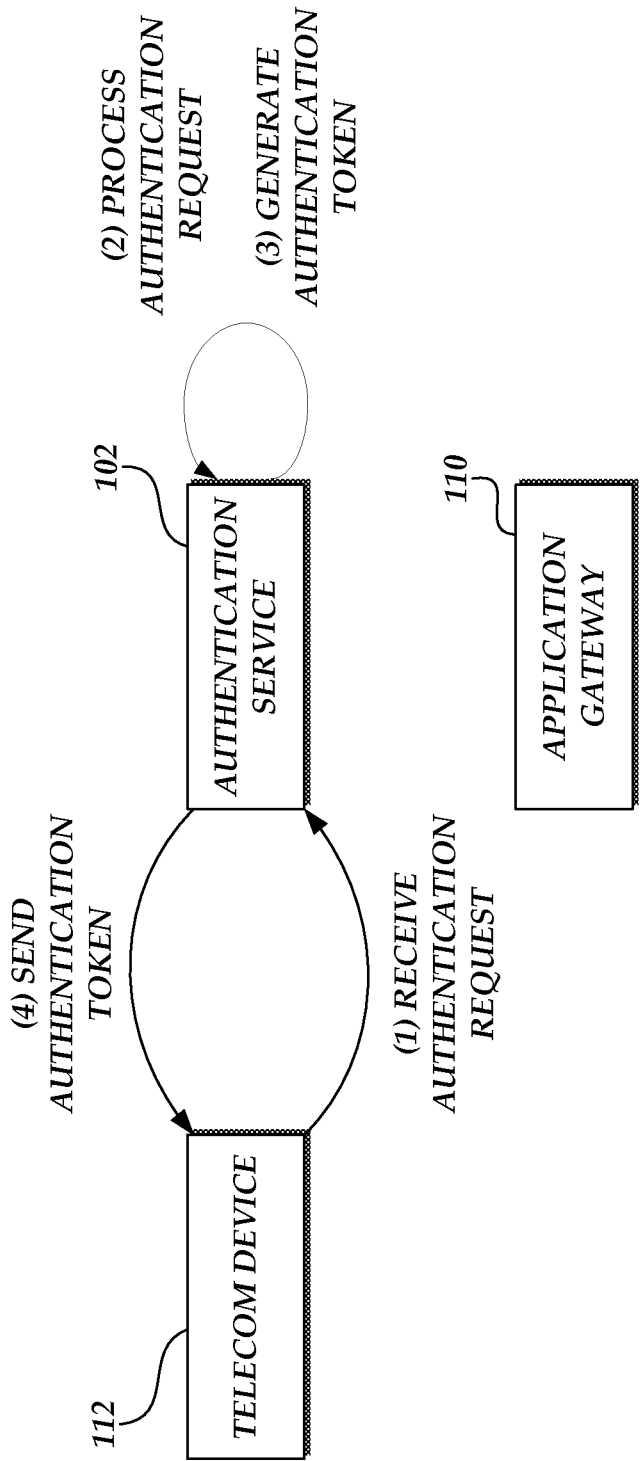
FIG. 3A is a flow diagram depicting an illustrative routine for an authentication session between a telecommunication device and an authentication service.

FIG. 3A illustrates interactions between a telecommunication device 112 and an authentication service 102 during an authentication session. The telecommunication device 112 can initiate an authentication session in order to interact with the application gateway 110 when authentication is required. An authentication session can also be initiated when the application gateway 110 requests authentication or when the lifetime of the authentication token has expired in the telecommunication device 112. The authentication session can establish a security association between the telecommunication device 112 and the authentication service 102. The security association can include a username (e.g., a bootstrapping transaction identifier (B-TID)) and a password (e.g., key material). The authentication service 102 can also provide security related information about a subscriber (e.g., user's private identity). The authentication session is valid for a finite period of time as defined by an expiry time in the authentication token. One embodiment of the authentication procedure can be based on the protocols as described in 3GPP TS 24.109, 3GPP TS 33.220, 3GPP TS 33.919, and all documents referenced therein. One skilled in the art may identify other mechanisms.

At (1) the authentication service receives an authentication request from a telecommunication device 112. The telecommunication device 112 can send a message to the authentication service 102 to initiate an authentication session. The telecommunication device 112 can include information about the subscriber, such as the user's private identity.

At (2) the authentication service 102 processes the authentication request. During the authentication process the authentication service 102 can engage in a series of protocol exchanges with other services and the telecommunication device 112 to successfully authenticate the telecommunication device 112.

In one embodiment, the authentication service 102 retrieves an authentication vector from a home subscriber system (HSS). The authentication service 102 selects an authentication vector for use in an authentication challenge. The authentication service 102 sends the authentication challenge to the telecommunication device 112. Upon receiving the authentication challenge, the telecommunication device 112 calculates the authentication challenge response and computes session keys. The authentication challenge response is sent from the telecommunication device 112 to the authentication service 102.

At (3) the authentication service 102 generates an authentication token. The authentication token can include a username, password, and expiry time. The expiry time can be determined dynamically each time the authentication service 102 generates an authentication token.

In some embodiments, the authentication service 102 can generate the expiry time based on the expected distribution of authentication sessions during a specific time frame. The authentication service 102 can monitor the number of subscribers with expiry times during the specified time frame, such as busy times of the day. The time frame can be subdivided into a plurality of smaller time periods. The authentication service 102 can group subscribers within the time periods based on expiry times. For example, the authentication service 102 could group the subscribers in fifteen minute increments, hour increments, or other appropriate time period. Based on the number of subscribers in each time period, the authentication service 102 can generate the authentication token with an expiry time in one of the time periods with a lower number of subscribers. In some embodiments, the authentication service 102 can start with a base expiry time. For example, the base expiry time can be 12 hours, 16 hours, 24 hours, 36 hours, or other appropriate length of time. The authentication service 102 can modify the base expiry time in order to facilitate a more even distribution of authentication sessions. In some embodiments, the authentication service 102 could increment the expiry time to the next available time period. In another embodiment, the authentication service 102 could increment or decrement the expiry time so that it corresponds to the time period with the lowest number of subscribers.

In another embodiment, the authentication service 102 can predict an expiry time based on the current subscriber data, historical subscriber data, and/or a combination of current and historical data. In some embodiments, the authentication service 102 can use an algorithm or other business logic to process and determine an appropriate expiry time for the authentication token. In some embodiments, a threshold can be associated with each time period that limits the number of expiry times that can be scheduled for the time period.

In some embodiments, the amount of time that the base expiry time can be increased or decreased can be constrained. If the expiry time is too short, the authentication service 102 is constantly re-authenticating the authentication token, thus increasing load on the hardware and reducing capacity. Constraints on the expiry time can also be determined based on security considerations.

After the authentication service 102 determines the expiry time and generates the authentication token, the authentication service 102 sends the authentication token to the telecommunication device 112 at (4).

Figure 3B:
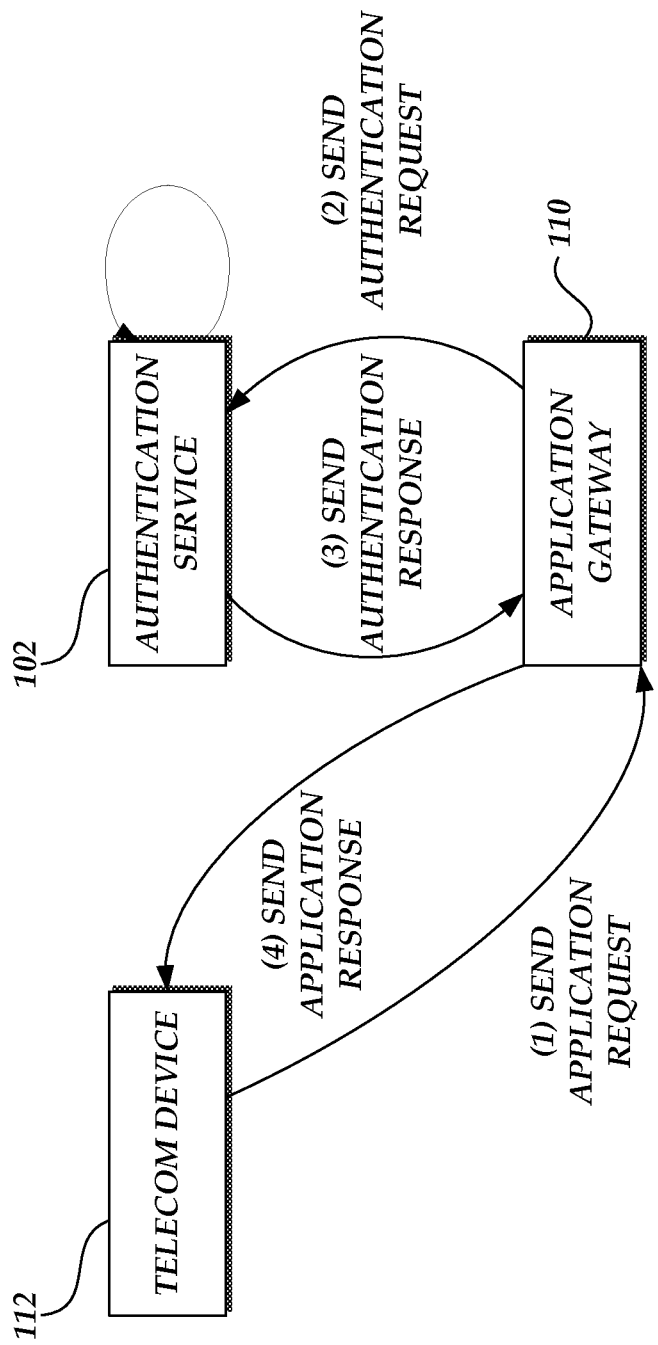
FIG. 3B is a flow diagram depicting illustrative interactions between a telecommunication device, an application gateway, and an authentication service.

FIG. 3B illustrates the interactions between the telecommunication device 112, application gateway, and the authentication service when the telecommunication device 112 interacts with an application. At (1) the telecommunication device 112 sends an application request to the application gateway 110. The application request provides information to the application gateway 110, including a username (e.g., a B-TID). In some embodiments, the telecommunication device 112 can start communication with the application gateway 110 over a Ua interface. If the authentication token generated using the process described in association with FIG. 3A has expired, the communication between the telecommunication device 112 and application gateway 110 is terminated. The telecommunication device 112 can initiate a re-authentication request with the authentication service 102 prior to proceeding, as described in association with FIG. 3A.

At (2) the application gateway 110 sends an authentication request to the authentication service 102. The application gateway 110 requests a password (e.g., key material) corresponding to the username supplied by the telecommunication device 112 to the application gateway 110. The application gateway 110 can also request one or more applicable user security settings for the applications. The application gateway 110 can communicate with the authentication service 102 over a Zn interface.

At (3) the authentication service 102 sends an authentication response to the application gateway 110. The authentication response can include the password, the bootstrapping time, and the expiry time. The authentication service 102 can also provide private user identity and requested user security settings to the application gateway 110.

At (4) the application gateway 110 sends an application response to the telecommunication device 112. After the process has been completed, the purpose of the authentication process has been fulfilled and the application gateway 110 can communicate with the telecommunication device 112 in a secure way, allowing further communication with downstream application servers.

Figure 4:
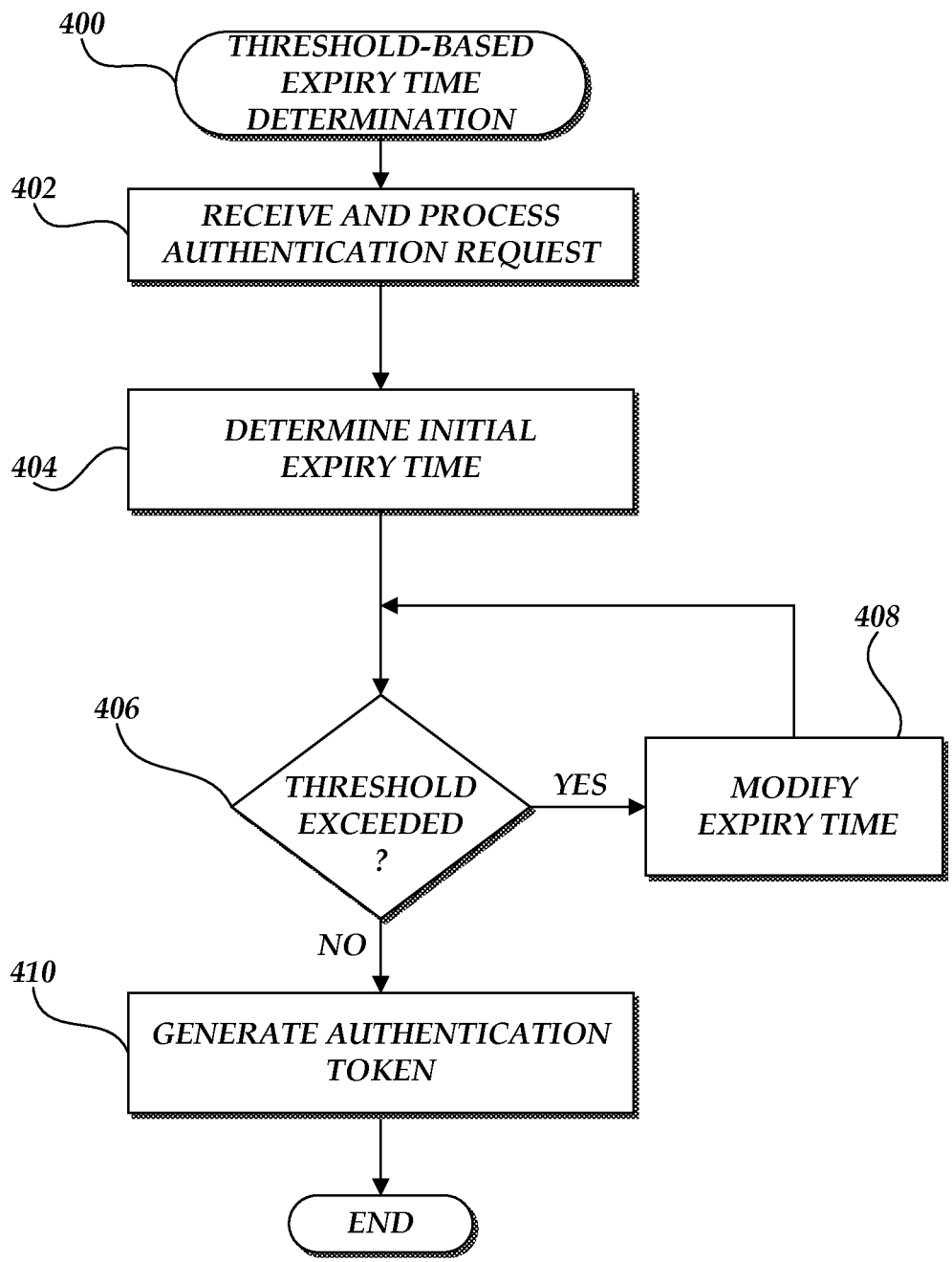
FIG. 4 is a flow diagram depicting an illustrative routine for determining the expiry time for an authentication token.

FIG. 4 is a flow diagram depicting an illustrative routine 400 for a threshold-based determination of the expiry time for the authentication token. Illustratively, the routine 400 can be implemented by the authentication service 102.

At block 402, the authentication service receives and processes an authentication request from a telecommunication device 112. The authentication service can receive information about the subscriber, such as the user's private identity. The authentication service 102 processes the authentication request. During the authentication process the authentication service 102 can engage in a series of protocol exchanges with other services and the telecommunication device 112 to successfully authenticate the telecommunication device 112.

At block 404, the authentication service determines an initial, or first, expiry time for the authentication token. The initial expiry time for the authentication token can be a base expiry time. In one embodiment, a base expiry time could be 24 hours from authentication. In some embodiments, the base expiry time can be 8 hours, 16 hours, or other appropriate period of time. The determination of the expiry time can be based on a number of subscribers that are scheduled to authenticate within a time period.

At block 406, the authentication service determines whether a threshold has been exceeded for the initial expiry time. The authentication service can have a threshold for the number of subscribers that can be scheduled to authenticate within each time period. In some embodiments, the threshold can be a maximum threshold. In some embodiments there can be more than one threshold, for example there can be a preferred threshold and a maximum threshold. The defined time period can be one minute, 15 minutes, 30 minutes, one hour, or other appropriate time period. A defined time frame, such as a day (i.e., 24 hours) can be divided up by a plurality of defined time periods. The authentication service can determine the number of subscribers that are scheduled to authenticate (i.e., the authentication token will expire) during each defined time period. The threshold can be used in order to help to distribute authentication sessions more evenly throughout the defined time frame. For example, a threshold could be a maximum of 500,000 subscribers scheduled to authenticate every hour. The threshold can be based on a number of factors such as hardware constraints, the total number of subscribers, and/or other factors. In some embodiments thresholds can be different for each time period. For example, the thresholds during high traffic times (e.g., the middle of the day) could be lower than the threshold during low traffic times (e.g., the middle of the night).

The authentication service references the threshold for the initial expiry time. If the threshold would be exceeded by using the initial expiry time, the authentication service rejects the proposed expiry time and the process proceeds to block 408. If the threshold has not been exceeded the process proceeds to block 410 and generates the authentication token using the proposed expiry time.

At block 408, the authentication service modifies the proposed expiry time in order to determine an expiry time where the threshold would not be exceeded. In some embodiments the authentication service can increase the expiry time by one or more time periods. In some embodiments the authentication service can decrease the expiry time by one or more time periods. The authentication service can use one or more algorithms to determine how to modify the proposed time. These algorithms may be predetermined static logic embedded in the software program of the authentication service or may be administered by the operator through configuration, e.g. with "regular expressions", mathematical formulas, or static time periods and thresholds. In some embodiments, the authentication service may only increment the expiry time. In some embodiments, the authentication service may decrement the proposed expiry time. In some embodiments, the authentication service may determine whether to increment or decrement the proposed expiry time based on the time of day. The authentication service continues to increment and/or decrement the expiry until a time period is found where the threshold would not be exceeded. The process proceeds to block 410 and the authentication service generates the authentication token using the modified expiry time. After the authentication token is generated, the authentication service sends the authentication token to the telecommunication device.

Figure 5:
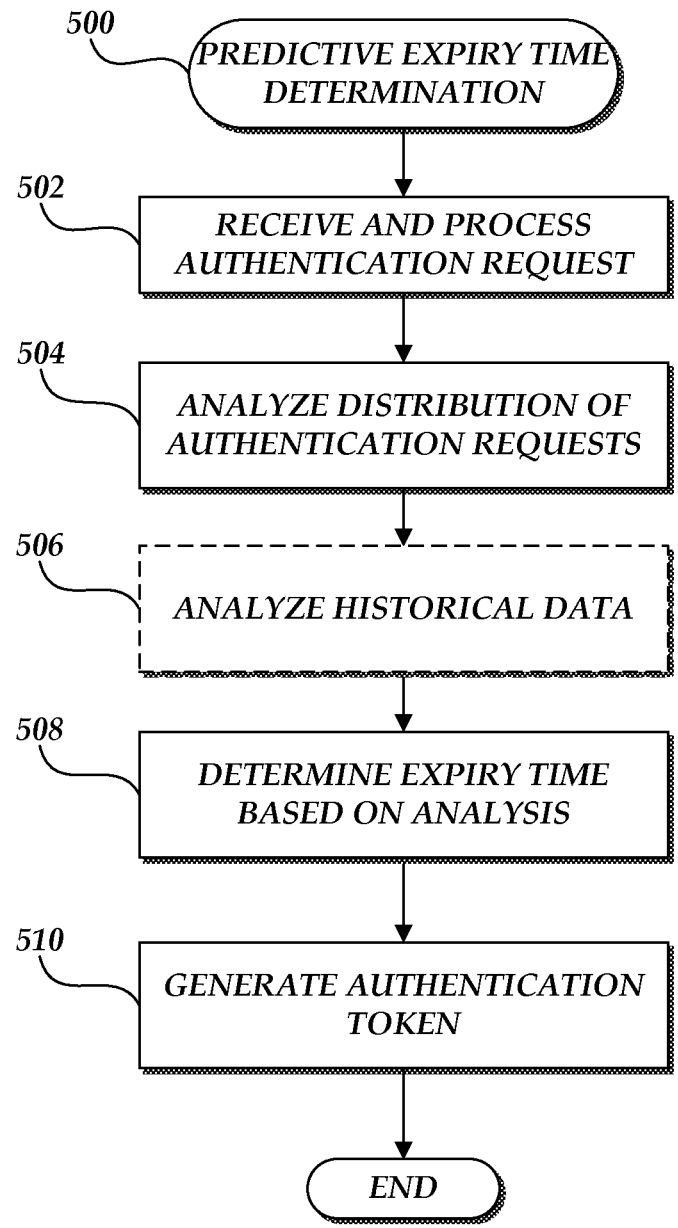
FIG. 5 is a flow diagram depicting another illustrative routine for determining the expiry time for an authentication token.

FIG. 5 is a flow diagram depicting an illustrative routine 500 for a predictive determination of the expiry time for the authentication token. Illustratively, the routine 500 can be implemented by the authentication service 102.

At block 502, the authentication service receives and processes an authentication request from a telecommunication device. The processing of the authentication request can consist of a protocol exchange between the telecommunication device and the authentication service to authenticate the telecommunication device. The processing of the authentication request is further discussed in association with FIG. 3A.

At block 504, the authentication service analyzes the distribution of authentication requests over a defined time frame divided into a plurality of defined time periods. For example, in some embodiments the authentication service can analyze the distribution over an eight hour time frame broken up into one hour time periods. In some embodiments the authentication service can analyze time frames of a greater duration, such as 24 hours, or a shorter duration, such as one hour. The authentication service can analyze the current network environment and determine the distribution of the authentication sessions scheduled throughout the defined time frame. The authentication service can determine the number of subscribers at each defined time period, the proportion of subscribers in each time period, the number of authentication sessions that the authentication service can accommodate for each defined time period, and other information.

At block 506, the authentication service can optionally analyze historical data relating to the authentication sessions. The historical data can be used to help balance server load throughout the defined time frame. The historical data can include information comparing scheduled authentication sessions with actual authentication sessions. The historical data can include subscriber information, such as the number of subscribers, the timing of authentication sessions, and the distribution of authentication sessions. This data can be compared to the number of subscribers that were scheduled to authenticate at each time period. This information can be used to help identify trends in authentication and help determine authentication times that properly balance the number of authentication sessions. The historical data can also help determine the effectiveness of the algorithms used to determine the expiry times. This data can be used to evaluate how to distribute the expiry times so that the authentication sessions are more evenly distributed.

In some embodiments, the historical data of the individual subscriber can be used to determine the time periods that the subscriber is most likely to use their telecommunication device. For example, the data can include the timing of previous authentication sessions, time period and of usage of the application gateway, and other statistics that can be helpful for predicting future usage.

At block 508, the authentication service can determine an expiry time based on the analyses conducted at blocks 504 and/or 506. The authentication service can use one or more algorithms and/or processes to determine the expiry time. In some embodiments, the authentication service can determine the expiry time based only on the data analyzed at block 506, based only on the historical data analyzed at block 508, and/or a combination of both. In one embodiment, the authentication service can determine the expiry time by reviewing the number of subscribers for each defined time period within a specified duration and selecting the time period with the fewest anticipated authentication sessions. In one embodiment, the authentication service may analyze the historical data of an individual subscriber compared to the current distribution authentication requests and select a time period when the user is expected to use the telecommunication device that has the lowest number of anticipated authentication requests. The authentication service can use any combination of data, algorithms, and/or processes to determine the expiry time for the authentication token.

At block 510, the authentication service generates the authentication token after determining the expiry time. The authentication service sends the authentication token to the telecommunication device.

All of the processes described herein may be embodied in, and fully automated via, software code modules executed by one or more general purpose computers or processors, which may also run in virtual machines on one or more physical computing units. The code modules may be stored in any type of computer-readable medium or other computer storage device. Some or all the methods may alternatively be embodied in specialized computer hardware. In addition, the components referred to herein may be implemented in hardware, software, firmware or a combination thereof. As such, reference in the disclosure to actions performed by a module or component relates to the execution of executable instructions by a processing device, or devices, to cause the referenced action to be performed.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is to be understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for management of authentication sessions, the computer-implemented method comprising:
 receiving an authentication request for an authentication session, wherein an authentication service receives the authentication request from a telecommunication device associated with a subscriber;
 analyzing a distribution of subscriber expiry times over a time frame wherein the time frame can be characterized into a plurality of time periods;
 determining an expiry time for the authentication session based, at least in part, on the distribution of subscriber expiry times over the time frame, wherein the expiry time is one of the plurality of time periods;

generating an authentication token with the determined expiry time; and sending the authentication token to a telecommunication device responsive to the authentication request.

2. The computer-implemented method of claim 1 further comprising:

analyzing historical data related to the distribution of subscriber expiry times; and determining the expiry time based, at least in part, the historical data in addition to the distribution of subscriber expiry times.

3. The computer-implemented method of claim 2, wherein the historical data is associated with the subscriber.

4. The computer-implemented method of claim 1, wherein the authentication service comprises a bootstrapping server function.

5. The computer-implemented method of claim 1, wherein the defined time frame is twenty-four hours.

6. The computer-implemented method of claim 1, wherein the defined time frame is eight hours.

7. The computer-implemented method of claim 1, wherein the determined expiry time is greater than twenty-four hours after generating the authentication token.

8. The computer-implemented method of claim 1, wherein the determined expiry time is less than twenty-four hours after generating the authentication token.

9. The computer-implemented method of claim 1, wherein each of the plurality of time periods are equal.

10. The computer-implemented method of claim 1, wherein each of the plurality of time periods is one hour.

11. The computer-implemented method of claim 1, wherein the determined expiry time is the time period with the least number of subscriber expiry times.

12. The computer-implemented method of claim 1, wherein the determined expiry time is based, at least in part, on an algorithm.

13. A telecommunication system, the system comprising:
an authentication server configured to:
communicate with a telecommunication device;
receive an authentication request for an authentication session;
analyze a distribution of subscriber expiry times over a time frame;
determine an expiry time for the authentication session based, at least in part, on the distribution of subscriber expiry times over the time frame;
generate an authentication token comprising the expiry time; and
send the authentication token to a telecommunication device responsive to the authentication request.

14. The system of claim 13, wherein the authentication service is configured to communicate with the telecommunication device over a bootstrapping interface.

15. The system of claim 13, wherein the authentication service comprises a bootstrapping service function.

16. The system of claim 13, wherein the authentication service is a network application function.

17. The system of claim 13, further comprising an application gateway configured to communicate with the authentication service.

* * * * *